(12) United States Patent
Gyugyi et al.

(10) Patent No.: US 7,603,574 B1
(45) Date of Patent: Oct. 13, 2009

(54) NETWORK INTERFACE SPEED ADJUSTMENT TO ACCOMMODATE HIGH SYSTEM LATENCY IN POWER SAVINGS MODE

(75) Inventors: Paul J. Gyugyi, Sunnyvale, CA (US); Roman Surgutchik, Santa Clara, CA (US); Raymond A. Lui, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 461 days.

(21) Appl. No.: 11/611,121

(22) Filed: Dec. 14, 2006

(51) Int. Cl.
*G06F 15/16* (2006.01)

(52) U.S. Cl. .............. 713/300; 713/310; 713/320; 713/321; 713/322; 713/323; 713/324; 713/330; 713/340; 370/232; 370/252; 709/233; 709/249; 709/250

(58) Field of Classification Search .......... 713/300, 713/310, 320–324, 330, 340; 370/232, 252; 709/233, 249, 250
See application file for complete search history.

(56) References Cited

U.S. PATENT DOCUMENTS

| 6,463,542 | B1 * | 10/2002 | Yu et al. ............ 713/320 |
| 7,127,521 | B2 * | 10/2006 | Hsu et al. ........... 709/233 |
| 7,327,754 | B2 * | 2/2008 | Mills et al. .......... 370/463 |
| 2003/0191854 | A1 * | 10/2003 | Hsu et al. ........... 709/233 |

OTHER PUBLICATIONS

Evers, Maris, Low Power AMD Athlon™ 64 and AMD Opteron™ Processors, Hot Chips 2004, pp. 1-15.

* cited by examiner

*Primary Examiner*—Abdelmoniem Elamin
(74) *Attorney, Agent, or Firm*—Cooley Godward Kronish LLP

(57) ABSTRACT

A system is coupled to a network by a network interface. In a power savings mode the speed setting of the network interface is reduced to accommodate increased system latency.

19 Claims, 4 Drawing Sheets

NETWORK INTERFACE SPEED ADJUSTMENT TO ACCOMMODATE HIGH SYSTEM LATENCY IN POWER SAVINGS MODE

FIELD OF THE INVENTION

The present invention is generally related to techniques to save power in computing systems coupled to a network.

BACKGROUND OF THE INVENTION

Computing systems are often coupled to a packet-based network. For example, Referring to FIG. 1, a computing system 100 may be coupled to an Ethernet network by a network interface 130. The computing system 100 may, for example have a central processing unit 105 internal bus 110, memory controller 115, and memory 120. In a network environment bursts of traffic 160 can arrive at any time, depending upon the actions of other client systems (not shown) coupled to the Ethernet network.

In some applications it is desirable to utilize computing system 100 as part of a "lossless" high speed (e.g., 1000 Mbit/s) network in which computing system 100 is designed to minimize data loss. That is, computing system 100 is designed and operated to avoid losing data packets in bursts of incoming traffic 160.

One problem with designing computing system 100 for "lossless" high-speed applications is that it limits the potential power-savings options that can be achieved in a cost-effective manner. Computing systems increasingly support a variety of power savings modes. However, power savings modes reflect a tradeoff between power consumption and performance. Typically, one tradeoff is a tradeoff between power consumption and system latency for performing memory accesses.

Many electronic systems have low power states, sometimes known as "sleep" states or "off states" although more generally there is now a spectrum of power down levels in addition to a "normal" operating state. For example, modern computer systems and graphics systems typically place different units and interfaces into a low power down state when specific units and interfaces are idle. As one example, a microprocessor may have power states C0-C3, where C0 is the operating state, C1 is a halt state, C2 is stop-clock state, and C3 is sleep state. Some microprocessors also have deep sleep (C4) and/or deeper sleep states that differ in how long it takes to wake up the processor. Some buses, such as the HyperTransport (HT) bus facilitate power management such that changes in processor state can signal changes to a lower power HT device state.

As examples of power down levels, a voltage of an integrated circuit, such as a central processing unit or memory controller, may be placed into low-voltage state as deeper power down level. As one example, some processors developed by the AMD corporation support a low power mode in which a CPU clock or voltage can be ramped down to save power. In these processors, an Alternate Voltage ID (AltVID) option permits chip voltage to be ramped down further after the clocks have ramped down. The AltVID option includes a programmable code sent to a voltage regulator to reduce microprocessor voltage to a minimum operational level for additional power savings. However, a tradeoff associated with using AltVID is that it has a higher transition latency than a conventional sleep mode.

In a network application bursts of data traffic 160 can arrive at the network interface at any time, even when computing system 100 is in power down level during an idle state. As a result, conventional computing systems designed to interface a network require a buffer 150 to store data that arrives as the computing system transitions out of a power-down level. That is, buffering is required for incoming data packets during the "wake up" time for all of the components along the upstream link to memory to transition to a normal operating level capable of receiving the incoming data. However, while the conventional approach works for low speed networks, in the context of high-speed networks (e.g., 1000 Mbits/s or greater) a prohibitive amount of buffering would be required to support a deep power down level while guaranteeing lossless behavior for bursts of traffic 160.

Therefore, it would be desirable to have an improved apparatus, system, and method for saving power in computing systems intended to be connected to a network in a lossless manner.

SUMMARY OF THE INVENTION

In a power savings mode a speed setting of a network interface is reduced to accommodate increased system latency. In one embodiment of a computing system the network interface has at least two selectable network speed settings. A receive buffer buffers incoming data traffic received by the network interface with the receive buffer having a maximum buffer size for buffering incoming data without loss. A data receiving portion of a computing system receives incoming data from the buffer. The data receiving portion has a plurality of performance levels including a normal operating level and at least two power down levels with each power down level having a latency associated with a transition to a normal operating state. A first power down level has a higher power consumption than a second power down level that has reduced power consumption and a higher latency. The computing system has a normal mode of operation having a first network speed in which the first power down level is used for an idle state. The computing system also has a power savings mode using the second power down level for the idle state to reduce power consumption with the computing system reducing the network speed setting in the power savings mode to a second network speed to limit the rate at which data arrives to reduce the maximum buffer size required during a wake up transition period from the second power down level to the normal operating level.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
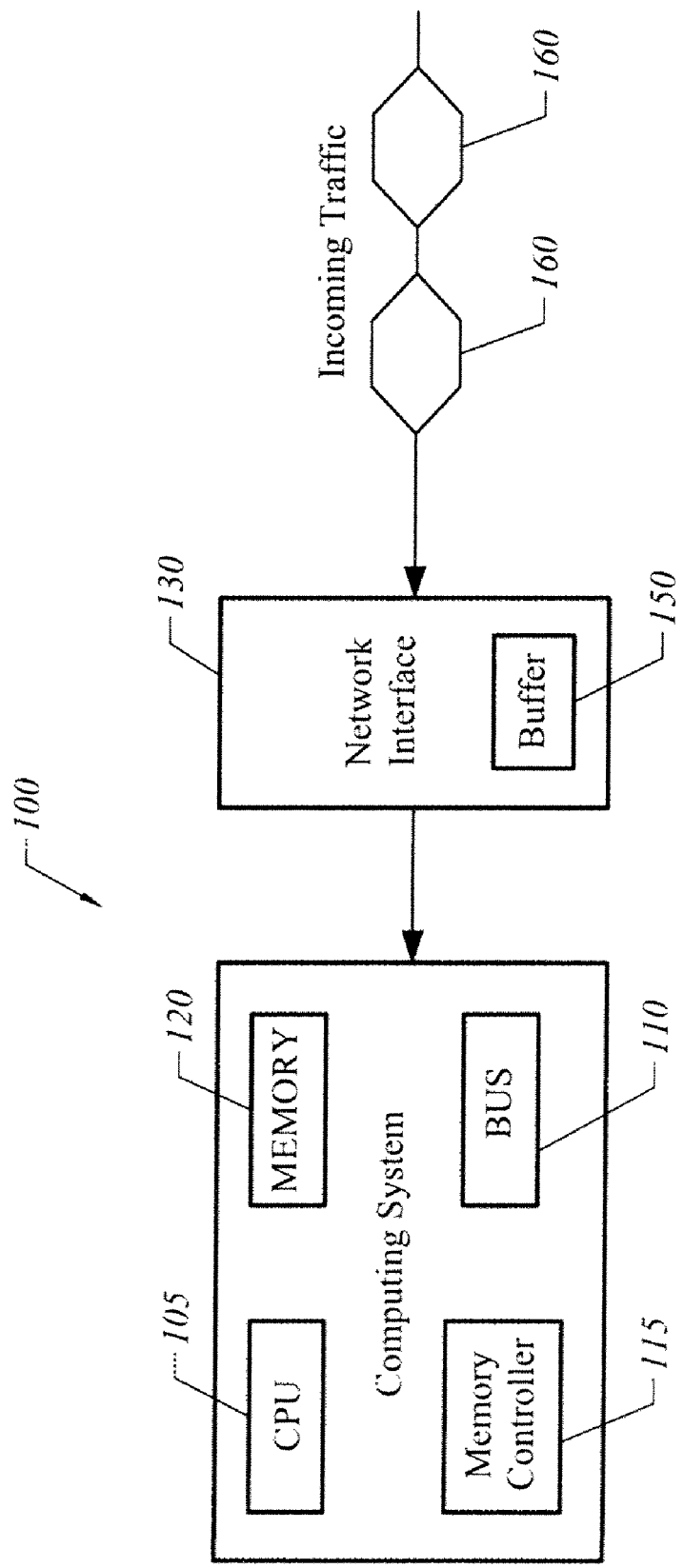
FIG. 1 illustrates a computing system coupled to a network in accordance with the prior art.
Figure 2:
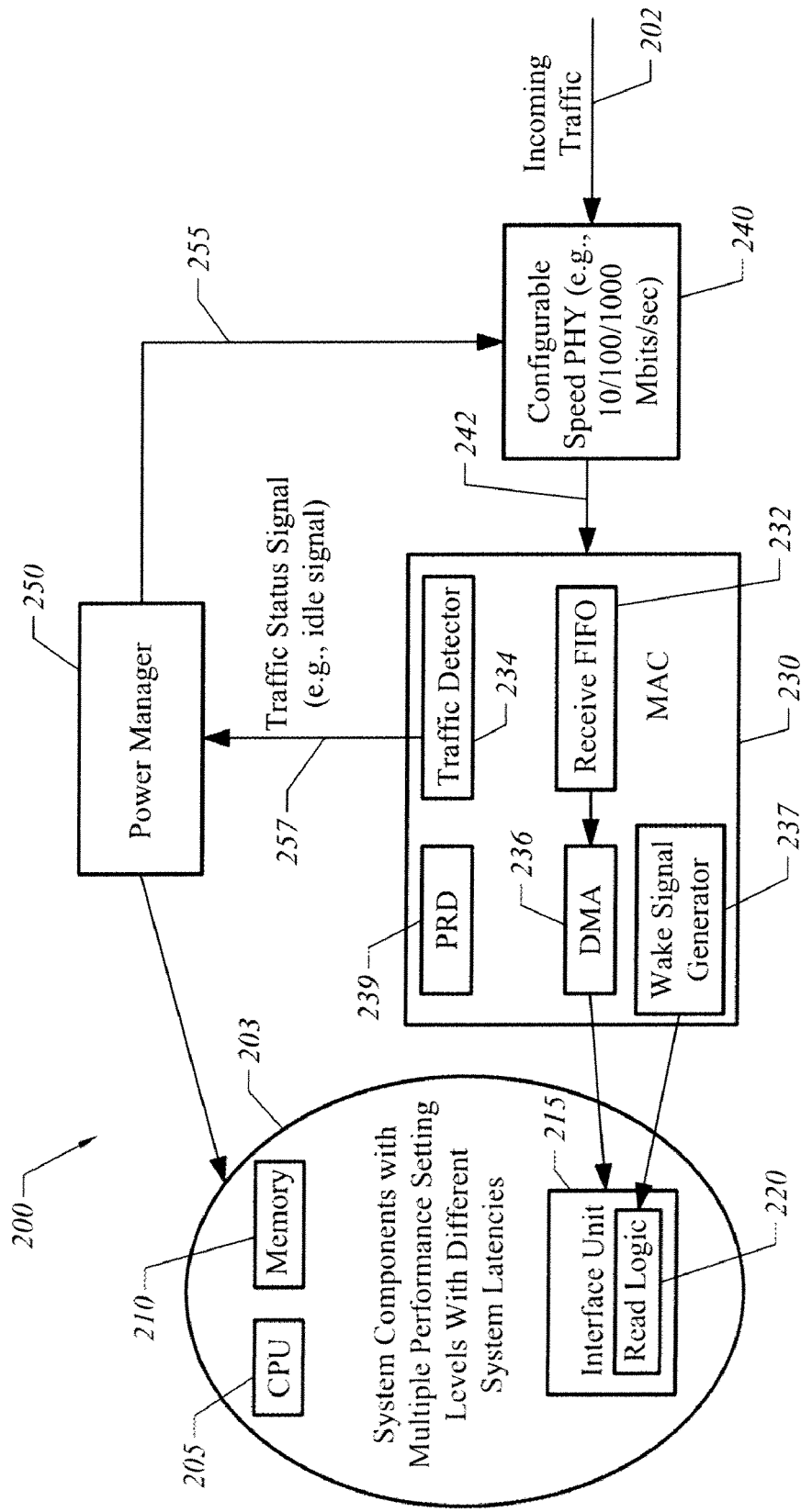
FIG. 2 illustrates a computing system in which network speed adjustments are made to accommodate increased system latency in power down modes in accordance with one embodiment of the present invention.

FIG. 2 illustrates a computing system 200 of the present invention. Computing system 200 is designed to be coupled to a network 202 such as a packet-based networks with an Ethernet network being one example of a packet-based network. A data receiving portion 203 of computing system 200 receives data from network 202 via MAC unit and may, for example include components to place incoming data into memory or an upstream link. Data receiving portion 203 may be implemented using different combinations of components to include a central processing unit, memory controller, and front side buses but in one exemplary implementation includes a central processing unit (CPU) 205, memory 210, and an interface unit 215 to support a CPU bus and an upstream link to memory 210. Interface unit 215 may, for example, have a bus or a bridge that includes a memory controller to access memory 210. Read logic 220 is provided in interface unit 215 to support read operations.

Data receiving portion 203 has a plurality of performance levels. Each performance level has an associated power consumption. One performance level may correspond to a normal operating level for processing incoming data traffic. Two or more performance levels correspond power down levels that have reduced power consumption for saving power in an idle state. Generally, the lower the performance level the higher the system latency for changing state to a different performance level. For example, with four performance levels, the system states can be referred to as LS0, LS1, LS2, LS3 states to indicate that each performance level has a different power level and a different system latency. In this nomenclature, the LSO state is the highest performance/minimum latency state and may correspond to a normal level of operation. Each successively higher LS number indicates a reduced power level and higher system latency. In one implementation, at least two of the higher LS states are power savings states corresponding to different power down levels, e.g., a "sleep mode" and a "deeper sleep" mode. As an illustrative example, in an implementation using an AMD CPU architecture, an AltVID mode may be supported such that there is both a normal "sleep" mode and a "deeper sleep" AltVID mode having a higher exit latency than the normal sleep mode. The "wakeup time" in the deeper power down levels increases with the deepest power savings states (e.g., AltVID) tending to have longer wakeup times, i.e., an increased exit latency to transition to the normal level of operation. Note that in a power down level the memory latency (for reading/writing data to memory) may be too high to support lossless reception of data, necessitating a transition to a higher power state.

Computing system 200 is coupled to network 202 by a configurable speed physical (PHY) network interface 240. Network interface 240 has a data speed that is selectable with at least two different speeds (e.g., in one implementation 10 Mbits/Sec. 100 Mbits/sec or 1000 Mbits/sec) by a control signal 255 from a power manager 250. In one embodiment power manager 250 is implemented as a software entity, although the functionality of power manager 250 may also be implemented as a microcontroller. As one example, network interface 240 may utilize an on-the-fly auto-negotiation protocol to negotiate a network speed with a link partner. For example, IEEE standard 802.3 section 28 describes auto-negotiation processes between link partners in an Ethernet network. In the context of devices capable of supporting 10 Mbps, 100 Mbps, and 1000 Mbps Ethernet speeds, auto-negotiation allows two link partners at either end of a link to advertise and negotiate the operational mode. In the Open Systems Interconnection Reference Model (OSI Model) auto-negotiation is considered to reside in the physical layer. Thus, when power manager 250 selects a new speed setting for network interface 240, network interface 240 in turn negotiates the selected speed setting with its link partner.

A Media Access Control (MAC) unit 230 is coupled to network interface 240 by an internal link 242. In an OSI model, MAC unit 230 performs data link layer functions. A receive first-in, first out (FIFO) buffer 232 is provided to buffer received data packets. In one implementation a traffic detector 234 is provided to generate a traffic signal 257 to power manager 250 on the status of traffic. Network traffic may arrive at any time such that there are two traffic states, an idle state and an active network traffic state. For example, in one embodiment, traffic detector 234 generates an idle signal when there is no incoming traffic. More generally, however, traffic detector 234 could generate any signal indicative of changes in incoming traffic and/or related to the utilization of receive FIFO 232.

MAC unit 230 includes a Direct Memory Access (DMA) engine 236 to perform data transfer of incoming data to interface unit 215. DMA engine 236 pulls data from the receive FIFO buffer 232 and places it onto an internal bus (not shown) of interface unit 215 for transfer into memory 210 via an upstream link. In one embodiment a wake signal generator 237 generates a wake signal in response to traffic detector 234 detecting incoming traffic. Network traffic may arrive at any time, even when portion 203 is in a power savings mode. The wake signal 237 is received by read logic 220 and provides a means to rapidly alert portion 203 of a need to prepare to handle incoming traffic, e.g., to rapidly wake up after an idle state. A PRD module 239 is provided to pre-fetch data structures required for arriving data when the system is in a power savings mode. Pre-caching data structures in PRD module 239 reduces latency compared to having to fetch the data structures from memory 210.

As previously discussed, there is both an idle state and an active network traffic state. Data traffic can arrive at any time, even when critical components of portion 203 are in a sleep mode. For lossless network applications, incoming packets that begin to arrive during the transition out of the sleep mode must be pushed into memory before the receive FIFO buffer 232 runs out of space. As previously described, the deeper power down levels have an increased system latency. Receive FIFO buffer 232 provides buffering to accommodate the latency for transitioning out of the lower performance levels (e.g., sleep modes) into the normal level of operation. Receiver FIFO buffer 232 has a maximum FIFO buffer size that limits the amount of data that it can buffer in a lossless manner as the system wake up and transitions from a sleep mode the normal operating level.

Power manager 250 implements policies to save power in a power savings mode. In a power savings mode, power manager 250 implements policies to place the network interface 240 into a lower speed setting to facilitate the use of deep power down levels in data receiving portion 203 for additional power savings compare to normal power down levels. That is, in a power savings mode power manager 250 proactively reduces the speed of interface 240 to reduce the rate at which incoming data is received to facilitate the use of a deeper power down level than would normally be possible if the network speed was held at the maximum speed. By reducing the incoming data rate in the power savings mode, the size of receive FIFO buffer 232 can be reduced with the FIFO buffer size reduction for lossless reception scaling with the reduction in network speed. As an illustrative example, in a conventional 1000 Mbits/sec network, the FIFO buffer would for the worst case have to be sized to accommodate receiving data at 1000 Mbit/sec through the transition period when the system wakes up from the selected deep power down level to the normal operating level. However, if the network interface speed is reduced to 100 Mbits/second, the size of the FIFO buffering required for the same selected deep power down level is reduced by a factor of ten compared with 1000 Mbits/sec.

Figure 3:
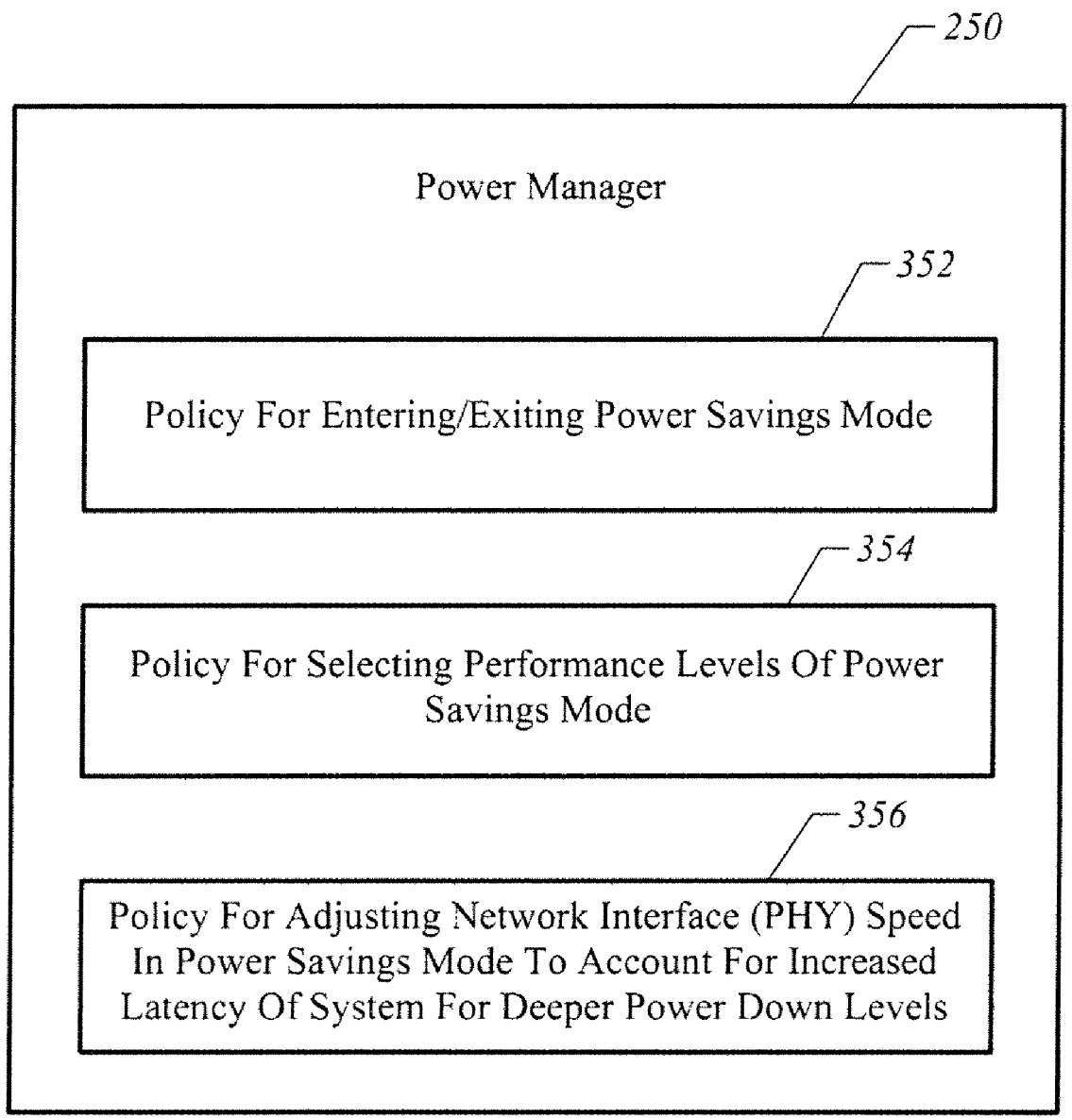
FIG. 3 illustrates policies of an exemplary power manager in accordance with one embodiment of the present invention.

Referring to FIG. 3, in one embodiment, power manager 250 includes a policy 352 for entering/exiting a power savings mode. For example, policy 352 may place system 200 is a power savings mode based on factors such as whether the system is operating off of battery power; traffic patterns, such as whether there is an idle state extending for a pre-selected time period; and user input. A policy 354 is provided for selecting performance levels in the power savings mode for both an active traffic state and an idle state. For example, in one implementation policy 354 adjusts a performance level for an idle state in the power savings mode. For example, for an idle state in a power savings mode, policy 354 may select a "deeper" power down level mode than would ordinarily be used for an idle condition when not in the power savings mode, such as lower voltage power down level (e.g., an AltVID mode in an AMD processor implementation). A policy 356 determines the adjustment to network speed in the power savings mode. For example, in one implementation, the network speed is reduced from a maximum speed setting to a pre-selected lower speed setting in the power savings mode. That is, in one implementation policy 356 switches the network between two network speeds in a normal mode and a power savings mode, e.g., a high network speed in a normal mode and a low network speed in a power savings mode. Thus, in one embodiment a maximum speed and at least one deep power down level (e.g., AltVID) are mutually exclusive with the system always reducing the network speed whenever the power down level with the greatest power savings is selected. However, more generally policy 356 may also include more advanced policies to adjust the network speed setting.

Figure 4:
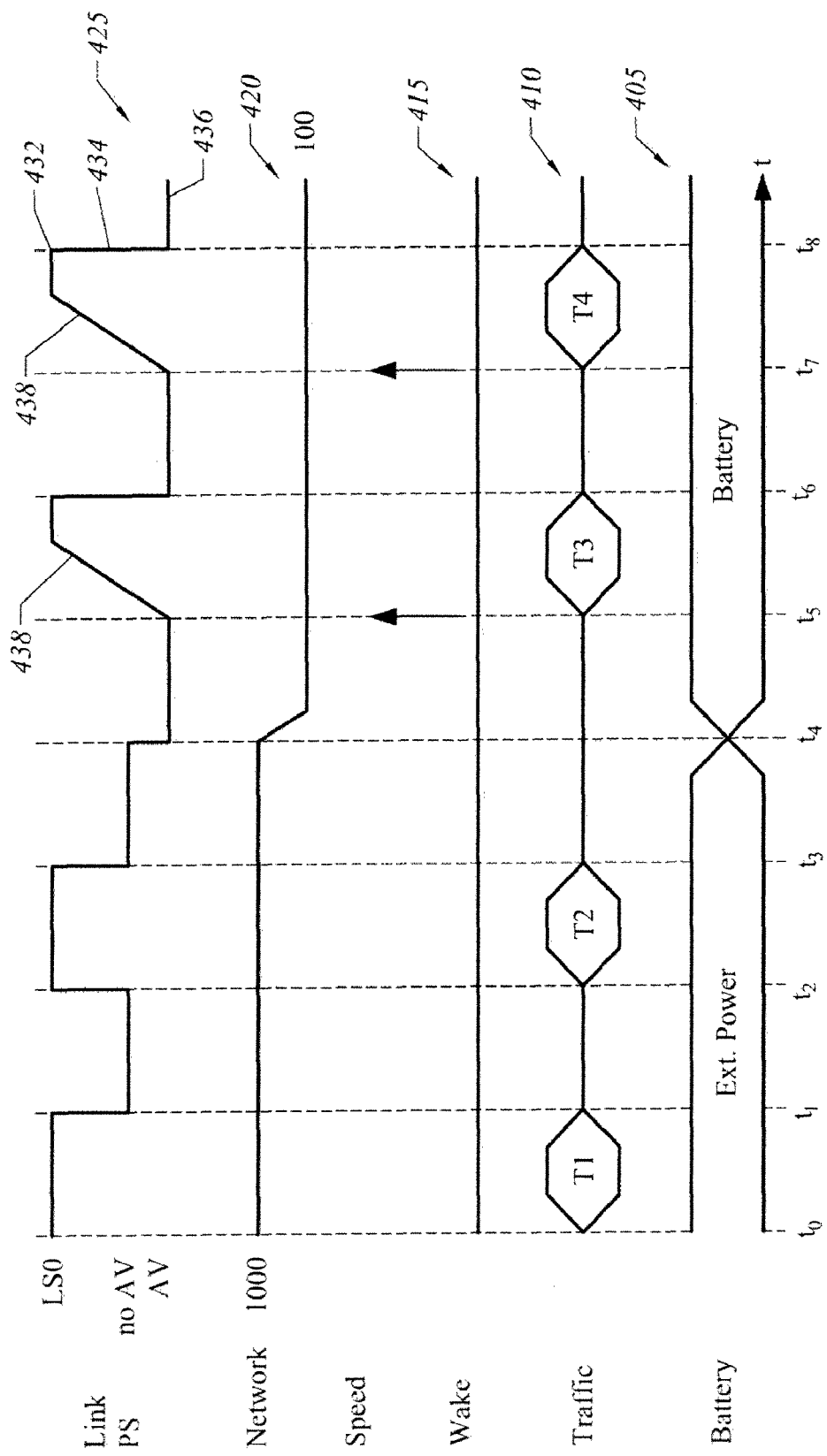
FIG. 4 illustrates an exemplary mode of operation in accordance with one embodiment of the present invention.

FIG. 4 illustrates an exemplary application in accordance with one embodiment of the present invention showing how various elements transition over time. As illustrated by graph 405, system 200 is in normal mode of operation for a first time interval t0 to t4, such as a mode operating in which the system is powered from an external power source (e.g., AC wall plug). In a second time interval t4 to t8, the system is in a power savings mode, such as a mode in which the system is operating off of an internal power source (e.g., battery power). As illustrated by graph 410, incoming traffic is received in bursts, such as traffic burst T1 from times t0 to t1, traffic burst T2 from time t2 to t3, traffic burst T3 from time t5 to t6, and traffic burst T4 from time t7 to t8. As shown in graph 415, in the power savings mode, a wake signal is generated when new traffic is detected, such as at times t5 and t7. The wake signal helps hardware to rapidly transition to an active state capable of processing incoming data. As illustrated in graph 420, the network speed is reduced in the power savings mode. In this example, the network speed is set at a high speed in the normal mode of operation (e.g., 1000 Mbits/sec) and is reduced in the power savings mode (e.g., reduced to 100 Mbits/sec in the power savings mode). Graph 425 illustrates the power consumption of the receiving portion 203 for the performance level (i.e., a link power/performance state) over time. In the normal mode of operation, a normal operating level (e.g., LSO) having a power level 432 is selected when there is incoming traffic T1 or T2. When there is an idle state in the normal mode of operation a performance level having a lower power consumption performance level 434 may be selected, such as a conventional sleep mode. In the power savings mode, an even lower power consumption performance level 436 is selected for the idle state corresponding to a deeper sleep mode, such as an AltVID mode. As illustrated by slopes 438, the deeper sleep state has a higher exit latency to the normal mode than the conventional sleep mode.

As can be observed in FIG. 4, one benefit of the present invention is that it permits a computing system to support high network speeds and also support deep power down levels (e.g., AltVID) with practical FIFO buffer sizes. Conventionally, a computing system designed to guarantee a high maximum network data rate (e.g., 1000 Mbit/s) in a "lossless" manner cannot support deeper power down levels (such as AltVID) with practical FIFO buffer sizes. The present invention permits an end-user to receive the benefit of the high network speed (e.g., 1000 Mbits/sec) in a normal mode of operation while also being able to receive the benefit of a power savings mode supporting deep power down levels (e.g., AltVID) for improved power savings.

As previously described, power manager 250 may be implemented in software which may be stored on a computer readable medium during manufacture, assembly, or use. Consequently, one embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computing system, comprising:
   a network interface having at least two selectable network speed settings with said network interface negotiating a link speed with a link partner based on a selected network speed setting;
   a receive buffer to buffer incoming data traffic received by said network interface, said receive buffer having a maximum buffer size for buffering incoming data without loss; and a data receiving portion of said computing system receiving incoming data from said receive buffer, said data receiving portion having a plurality of performance levels including a normal operating level and at least two power down levels with each power down level having a latency associated with a transition to a normal operating state, a first power down level having a higher power consumption than a second power down level having reduced power consumption and a higher latency;
   said computing system having a normal mode of operation having a first network speed in which said first power down level is used for an idle state;
   said computing system having a power savings mode using said second power down level for the idle state to reduce power consumption and said computing system reducing the network speed setting in the power savings mode to a second network speed to limit the rate at which data arrives to reduce said maximum buffer size required during a wake up transition period from said second power down level to said normal operating level.

2. The computing system of claim 1, wherein said second power down level has a reduced operating voltage compared with said first power down level.

3. The computing system of claim 1, wherein said second power down level comprises an alternate voltage ID mode.

4. The computing system of claim 1, wherein said receive buffer has a maximum buffer size less than a worst case maximum buffer size that would be required to support lossless network reception of traffic with said network interface set at the first network speed during a transition period from said second power down level to a normal operating level.

5. The computing system of claim 1, further comprising a wake signal generator to alert said data receiving portion to wake up from an idle state.

6. The computing system of claim 1, wherein said computing system selects said power savings mode based on whether said system is powered by an internal or external power source.

7. The computing system of claim 1, wherein said computing system selects said power savings mode based on traffic patterns.

8. The computing system of claim 1, wherein said computing system selects said power savings mode based on a user input.

9. The computing system of claim 1, wherein said first network speed and said second power down level are mutually exclusive for lossless network reception.

10. The computing system of claim 9, wherein said second power down level has a voltage less than said first power down level.

11. The computing system of claim 1, wherein a reduction in network speed in the power savings mode is selected such that said maximum buffer size of said receive buffer is less than a buffer size that would be required to perform buffering for the transition period from said second power down level to said normal mode at the maximum speed setting.

12. A computing system, comprising:
    a network interface for an Ethernet network having at least two selectable Ethernet network speed settings with said network interface negotiating a link speed with a link partner based on a selected network speed setting:
    a Media Access Control (MAC) unit having a receive buffer to buffer incoming data traffic received by said network interface, said receive buffer having a maximum buffer size for buffering incoming data without loss;
    a data receiving portion of said computing system receiving incoming data from said receive buffer, said data receiving portion having a plurality of performance levels including a normal operating level and at least two power down levels with each power down level having a latency associated with a transition to a normal operating state, a first power down level having a higher power consumption than a second power down level having reduced power consumption and higher latency; and
    a power manager selecting a maximum speed setting for said network speed setting in a normal mode utilizing said first power down level for an idle state and utilizing said second power down level for an idle state in a power savings mode, said power manager selecting a reduced network speed setting that is less than said maximum speed setting in said power savings mode to limit the rate at which data arrives during a transition period from said second power down level to said normal operating level in said power savings mode.

13. The computing system of claim 12, wherein a reduction in network speed in the power savings mode is selected such that said maximum buffer size of said receive buffer is less than a buffer size which would be required to perform buffering for the transition period from said second power down level to said normal mode if the network speed was set at the maximum speed.

14. The computing system of claim 12, wherein said first power down level and said second power down level have different voltages.

15. The computing system of claim 12, further comprising a wake signal generator to alert said data receiving portion to transition to a higher performance state in response to detection of incoming data traffic.

16. The computing system of claim 12, wherein said computing system reduces network speed in a power savings mode corresponding to power source mode.

17. The computing system of claim 1, wherein said computing system reduces network speed based on at least one of traffic patterns and user-input.

18. A method of operating a computing system to receive network traffic, comprising: tar a normal mode of operation, selecting a maximum network interface speed and performance levels of a receiving portion that include a normal operating level for active traffic and a first power down level for an idle state;
    for a power savings mode, selecting a reduced network interface speed and performance levels of a receiving portion that include the normal operating level for active traffic and a second power down level for idle traffic with the second power down level having reduced power consumption and a higher latency compared with said first power down level,
    the reduced network interface speed selected for the power savings mode to limit the rate at which data is received from said network interface to reduce buffering required to accommodate the increased latency of said second power down level.

19. The method of claim 18, wherein said first power down level and said second power down level have different operating voltages.

* * * * *